US011548582B2

(12) United States Patent
Burri Michel et al.

(10) Patent No.: US 11,548,582 B2
(45) Date of Patent: Jan. 10, 2023

(54) COMPACT THREE-WHEELED ELECTRIC VEHICLE

(71) Applicant: Share Your BICAR AG, Bubikon (CH)

(72) Inventors: Adrian Burri Michel, Bubikon (CH);
Hans-Jörg Dennig, Bubikon (CH);
Cyrill Jacomet, Winterthur (CH);
Salome Johanna Berger, Pfungen (CH)

(73) Assignee: SHARE YOUR BICAR AG, Bubikon (CH)

( * ) Notice: Subject to any disclaimer, the term of this patent is extended or adjusted under 35 U.S.C. 154(b) by 0 days.

(21) Appl. No.: 17/277,796

(22) PCT Filed: Sep. 20, 2019

(86) PCT No.: PCT/EP2019/075416
§ 371 (c)(1),
(2) Date: Mar. 19, 2021

(87) PCT Pub. No.: WO2020/058513
PCT Pub. Date: Mar. 26, 2020

(65) Prior Publication Data
US 2021/0316808 A1 Oct. 14, 2021

(30) Foreign Application Priority Data
Sep. 21, 2018 (DE) .......................... 102018123252.7

(51) Int. Cl.
*B62K 5/10* (2013.01)
*B62K 5/027* (2013.01)
(Continued)

(52) U.S. Cl.
CPC ................ *B62K 5/10* (2013.01); *B62K 5/027* (2013.01); *B62K 5/05* (2013.01); *B62K 5/08* (2013.01); *B62M 6/90* (2013.01); *B62K 2204/00* (2013.01)

(58) Field of Classification Search
CPC . B62K 5/10; B62K 5/027; B62K 5/05; B62K 5/08; B62K 2204/00; B62K 5/06;
(Continued)

(56) References Cited

U.S. PATENT DOCUMENTS 4,020,914 A * 5/1977 Trautwein ............ B60G 21/007
280/267
7,487,985 B1 * 2/2009 Mighell ................. B62K 5/027
280/124.126
(Continued)

FOREIGN PATENT DOCUMENTS

DE 202008012695.9 U1 6/2009
DE 102016110346 A1 12/2017
(Continued)

OTHER PUBLICATIONS https://netcarshow.com/toyota/2013-i-road_concept/ (Year: 2013).*
(Continued)

*Primary Examiner* — Darlene P Condra
(74) *Attorney, Agent, or Firm* — Murphy, Bilak & Homiller, PLLC (57) ABSTRACT

The invention relates to a three-wheeled electric vehicle (10) comprising a front-axle device (22) having two steerable front wheels (24a, 24b) which are aligned substantially parallel to each other when traveling straight ahead; a rear-axle device (12) with a driven rear wheel (14); and a vehicle frame (26) on which the front-axle device (22) and the rear-axle device (12) are supported; wherein the front-axle device (22) is designed such that when the steering
(Continued)

angle is rotated, the vehicle frame (26) and the front wheels (24a, 24b) may be tilted in the direction of the rotated steering angle. The compactness value KW, which is calculated from the ratio of the distance SP between the front wheels (24, 24B) when arranged substantially parallel to each other for a straight-ahead travel to the wheelbase RS between the front wheels (24a, 24b) and the rear wheel (14), said wheelbase being measured when the front wheels (24, 24b) are positioned for a straight-ahead travel, satisfies the following condition: KW=SP/RS 0.35≤KW≤0.80, in particular 0.62≤KW≤0.78.

16 Claims, 8 Drawing Sheets (51) Int. Cl.
*B62K 5/05* (2013.01)
*B62K 5/08* (2006.01)
*B62M 6/90* (2010.01)

(58) Field of Classification Search
CPC ......... B62M 6/90; B62M 6/85; B62D 23/005; B62D 61/065; B62D 31/003
See application file for complete search history.

(56) References Cited

U.S. PATENT DOCUMENTS

| | | | | |
|---|---|---|---|---|
| 7,591,337 B2 * | 9/2009 | Suhre | | B60G 3/20 |
| | | | | 280/5.509 |
| 7,641,207 B2 * | 1/2010 | Yang | | B62K 5/027 |
| | | | | 280/271 |
| 7,648,148 B1 * | 1/2010 | Mercier | | B62K 5/05 |
| | | | | 280/5.509 |
| 8,006,796 B1 * | 8/2011 | Fontaine | | B60K 1/00 |
| | | | | 180/242 |
| 8,973,930 B2 * | 3/2015 | Rhodig | | B60G 17/08 |
| | | | | 280/5.509 |
| 9,969,454 B2 * | 5/2018 | Terada | | B62K 3/002 |
| 2007/0193803 A1 * | 8/2007 | Geiser | | B62D 9/02 |
| | | | | 180/215 |
| 2008/0258416 A1 | 10/2008 | Wilcox | | |
| 2012/0181765 A1 | 7/2012 | Hill et al. | | |
| 2012/0321381 A1 * | 12/2012 | Ohgitani | | B60K 1/04 |
| | | | | 403/376 |
| 2014/0250653 A1 * | 9/2014 | Droste | | H01M 10/44 |
| | | | | 29/729 |
| 2015/0340794 A1 * | 11/2015 | Gonzales | | H01R 13/6397 |
| | | | | 29/426.1 |
| 2019/0232803 A1 * | 8/2019 | Chen | | H01M 50/20 |
| 2019/0322071 A1 * | 10/2019 | Liu | | H01R 13/6397 |
| | | | | 29/426.1 |

FOREIGN PATENT DOCUMENTS

| | | | |
|---|---|---|---|
| GB | 2374327 A | 10/2002 | |
| WO | 2011032368 A1 | 3/2011 | |
| WO | WO-2016153093 A1 * | 9/2016 | ............... B62B 7/12 |
| WO | 2017064631 A1 | 4/2017 | |

OTHER PUBLICATIONS

"La Ville? <<SAM>> VAÜ", Revue Automobile, Buechler Grafino AG, Berne, CH, No. 24, ISSN: 0035-0761, XP001096976, Aug. 2001 (Aug. 23, 2001), p. 9.
"Minds Eye Design", "10 Leaning Vehicles | Innovative Trikes and Electric Three Wheelers" Youtube, p. 1 pp., Retrieved from the Internet: https://www.youtube.com/watch?v=SXn7yOEdpkE&feature=youtu.be [retrieved on Nov. 22, 2019], XP054979944, min 1:09, min 4:14, Nov. 2017 (Nov. 25, 2017).
"Bibliographic information for "Toyota i-Road is a real head-turner"", Cnet, XP No. 55913656, Feb. 4, 2015.
"BMW C1-E—Elektroroller von BMW : Strom-Studie", Oct. 13, 2009.

* cited by examiner

COMPACT THREE-WHEELED ELECTRIC VEHICLE

The invention relates to a three-wheeled electric vehicle comprising a front-axle device direction having two steerable front wheels, which are aligned essentially in parallel to one another in the straight-run position; a rear axle device comprising a driven rear wheel; and a vehicle frame on which the front-axle device and the rear-axle device are supported, wherein the front axle device is formed such that, during a steering movement, the vehicle frame and the front wheels may tilt in the direction of the steering movement.

Examples of similar vehicles are "i-Road" by Toyota having a steerable rear wheel or "Sway" by Sway Motorsports. There are also examples of three-wheeled vehicles featuring tilting technology which comprise a combustion engine, such as the MP3 300 by Piaggio.

In WO 2017/064631 A1 a three-wheeled vehicle according to the preamble of claim 1 is shown, which comprises a specific configuration of the parallel kinematic front-wheel suspension, with no details on the further construction of the vehicle being described.

In today's cities it has been shown that with an increasing resident population, the space available for traffic areas is insufficient to handle individual traffic. Individual traffic not only includes being on the move with a vehicle, but also parking a vehicle. In both cases, space is required. It must be taken into account here that there is often only one person sitting in a vehicle, so that the space required by the vehicle is too large in relation to the only person transported with it. On the other hand, in cities there is a regular need as an individual to get from one place to another quickly.

The object on which the invention is based is seen in specifying a three-wheeled electric vehicle in which the above disadvantages may be avoided.

To solve this problem, a three-wheeled electric vehicle is provided comprising a front-axle device having two steerable front wheels which are aligned essentially in parallel to one another in the straight-run position;

a rear-axle device comprising a driven rear wheel;

a vehicle frame on which the front-axle device and the rear-axle device are supported;

wherein the front-axle device is such that, during a steering movement, the vehicle frame (26) and the front wheels (24*a*, 24*b*) may tilt in the direction of the steering movement.

The vehicle is characterized in that a compactness value KW, which is calculated from the ratio between the distance SP between the front wheels, which are arranged essentially in parallel to one another in the straight-run position, and the wheelbase RS measured between the front wheels (24*a*, 24*b*) and the rear wheel (14) in the straight-run position of the front wheels (24, 24*b*), satisfies the following condition:

with $KW=SP/RS$ $0.50 \leq KW \leq 0.80$, more preferably $0.62 \leq KW \leq 0.78$.

The distance SP between the front wheels, which are arranged essentially parallel to one another in the straight-run position, is to be understood as what is known as a track and is measured in the middle, based on the width of the wheels.

Such a configuration of the vehicle ensures that the vehicle requires only little traffic area or space, while at the same time providing safe driving stability due to the tilting technology used when cornering.

The wheelbase RS may be 1300 mm or less, more preferably 900 mm to 1100 mm, and the distance SP between the front wheels, which are arranged essentially parallel in the straight-run position, may be 1000 mm or less and 500 mm or more, more preferably 600 mm to 800 mm.

If such dimensions are applied to the vehicle, taking into account the above-mentioned compactness value KW, such a vehicle usually takes up an area smaller than 1.5 $m^2$. In particular, the wheelbase RS and the distance (track SP) may be chosen such that a rectangle circumscribing the three wheels, which may be understood as a kind of projected base area of the vehicle and which may be determined, for example, as rectangle sides from the vehicle length and the vehicle width, has an area of about 0.8 to 1.2 $m^2$. In this way, at least two or more of the three-wheeled electric vehicles described herein may be accommodated in the same area that is currently used for a single small or medium-sized car.

The key figures or dimensions presented herein for a three-wheeled electric vehicle are based on the finding that a space-saving electric vehicle is not possible by merely reducing the size of vehicles of known design, but that the vehicle has sufficient stability and good or nonproblematic driving characteristics while taking up as little space as possible.

The rear wheel may, in the straight-run position, be arranged centrally between the front wheels so that an angle of 15° and more, more preferably of 17.5° and more, is formed between a central longitudinal axis of the vehicle and an imaginary connecting line between the rear wheel and one of the front wheels. The imaginary connecting line may be measured, for example, from the respective centers of the rear wheel and the relevant front wheel. Defining a minimum angle ensures that the vehicle has a secure standing position on its three wheels. Usually, the angle will not be greater than 30°.

A seat device for a driver of the vehicle may be arranged on the vehicle frame, wherein a seat surface of a seat of the seat device in the unloaded state of the vehicle is located at a height above the ground supporting the vehicle which is 700 mm or more. This ensures that people of different sizes may sit in the vehicle and operate the vehicle. In particular, the vehicle with its seating arrangement is configured such that both a 5-percentile woman and a 95-percentile man may comfortably fit into it.

The seat of the seat device may be adjustable in the longitudinal direction of the vehicle relative to the vehicle frame, in particular by 150 to 200 mm along an adjustment plane that is essentially parallel or inclined to the ground. This enables an optimal position of the driver in the vehicle to be set so that, on the one hand, operation is convenient and, on the other hand, a good overview is provided for people of different sizes while driving. The seat adjustment in the longitudinal direction may be parallel to the floor or ground or at an angle obliquely backwards and upwards of more than 0° to 20°.

The seat device may have a backrest which is adjustable with the seat in the longitudinal direction of the vehicle and/or which is adjustable relative to the seat. It is conceivable that the backrest may be adjusted both in its position in the longitudinal direction relative to the vehicle seat, but may optionally also be adjusted in its inclination.

The vehicle frame may be closed in itself and formed such that it surrounds a driver accommodated in the vehicle, in particular the upper body and head of a driver. Such a configuration increases the safety for a driver of the vehicle, especially in the event of a collision. Furthermore, such a frame structure also offers improved options with regard to the protection of an occupant from the weather.

A safety device, in particular a seat belt device, may be arranged on the vehicle frame, at least one holding point of the safety device being arranged on the vehicle frame such that forces acting on the safety device are introduced into an upper and/or front section of the vehicle frame. It may thus be achieved that forces acting in the event of a collision are optimally distributed over the entire vehicle frame. In contrast thereto, in known three-wheeled vehicles it is often the case that holding points are only provided in a lower area of the vehicle or are attached to the seat itself.

A casing, which is formed from at least one casing element, may be arranged on the vehicle frame. The casing may be formed such that access to the vehicle is enabled obliquely from the rear or from the side in relation to its longitudinal direction. Furthermore, the casing may comprise at least one transparent casing element formed as a windscreen. Apart from cladding elements, it is also possible to cover the frame with a textile or to fasten a textile between the frame elements and thus ensure protection of the driver from the weather. The casing serves as weather protection for the occupants of the vehicle. Furthermore, the casing forms an aerodynamically optimized shell so that the air resistance of the vehicle may be kept as low as possible.

The casing may have at least one solar panel. Thus at least part of the electricity required to drive the vehicle may be obtained from solar energy.

The vehicle frame may also be formed such that a storage space is formed in an area above the front wheels. This storage space is used to hold objects such as a bag, backpack or the like are to be carried along by an occupant. The storage compartment is protected from the weather by the cladding. The storage space is accessible to an occupant from inside the vehicle. The storage space may be an open or a completely closed compartment. Access from the front is also possible and the compartment may be lockable. Locking and unlocking of the compartment and activation of an associated electromechanical lock occurs by activating a trigger command at an actuator on the vehicle or software that the user triggers on their mobile device (smartphone) and on-board electronics of the vehicle is controlled via Bluetooth or another wireless communication solution. The lock may also be activated by actuating a switch in the vehicle.

The electric drive is formed as a wheel hub motor which acts on the rear wheel. This enables simple and low-maintenance power transmission from the electric motor to the rear wheel to be driven.

The vehicle may comprise a battery arrangement having at least one battery, the battery arrangement being formed such that the at least one battery is received in a detachable fastening, wherein a detachable electrical contact from the battery to the power supply lines is made at the same time that the battery is received in the fastening. This enables quick replacement of a or the battery. In particular, it is conceived that the battery may be exchanged by means of one-handed operation. The battery arrangement may, in particular, be provided in a lower area of the vehicle, for example below a footrest for the occupant. Alternatively, a battery may also be arranged below the seat.

The battery arrangement may comprise a battery compartment in a base plate, which is provided with a cover, wherein a lock is provided on the cover which may be unlocked by activating a switch or triggering activation on a mobile radio device. This enables access to the battery, which may then be removed with one hand. In particular, the battery compartment is formed by elements of the vehicle frame and is provided with a base plate towards a foot space of the vehicle.

In order to simplify maintenance and repair, the front-axle device, together with a tilt kinematics system of the front wheels, may be releasably connected to the vehicle frame as a complete unit. For the same purpose, the rear-axle device may be releasably connected to the vehicle frame as a unit together with a wheel suspension and a suspension device. This enables a modular structure of the vehicle essentially existing of the components or modules of the front-axle device, rear-axle device, vehicle frame and casing.

The three-wheeled vehicle may comprise at least one tilt actuator which is configured to adjust the lateral tilt of the vehicle when cornering. In this way, the driving behavior of the vehicle may be optimized, wherein extreme driving situations or tilts, in particular, may be mitigated or avoided.

The at least one tilt actuator may be configured to set the lateral tilt based on at least one driving data variable, in particular based on a detected steering angle and/or on the speed of the vehicle and/and on the lateral inclination of the vehicle relative to the ground.

The at least one actuator may be fastened to the part of the vehicle to be tilted, so that it may influence the lateral inclination by means of a gear ratio that is fastened to the parallelogram of the tilt kinematics system. A reverse arrangement is of course also conceivable. Alternatively, the lateral inclination may also be formed by one or more linear cylinders or other actuators as tilt actuator(s) so that the angle between the wheel connecting rods and the part of the vehicle to be tilted may be changed. The active tilt actuator (s) may act on the inclination kinematics system directly or via a transmission device such as a kinematic linkage, a cable pull or the like.

By means of the at least one tilt actuator, the tilt may, for example, be blocked or adjusted as a function of various input parameters. Adjustment of the lateral tilt is thus possible as a function of the driving speed or the steering angle, regardless of the driver's action, for example. If the lateral tilt is adjusted as a function of the inclination of the vehicle relative to the ground, the vehicle may, in particular, be prevented from tipping over. The tilt actuator may also be embodied in such a way that it may be activatable or deactivatable.

The three-wheeled vehicle may comprise at least one steering actuator which is configured to set a steering angle of the front wheels.

The at least one steering actuator may be configured to carry out steering movements in a fully automated manner or to at least partially support manual steering movements by a user or to allow manual steering movements by the user only. Steering by means of the steering actuator may, for example, be between 100% switched off (deactivated) and 100% switched on (automated steering activated). Furthermore, intermediate stages of activation of the steering actuator are also conceivable, in which the steering actuator may support and/or correct manually executed steering movements. In the case of activated automated steering, the driver does not have to carry out any steering movements. In this case, the steering actuator may be controlled, for example, by a control unit or software. The steering angle may be determined, for example, based on various input parameters, for example by input parameters which are detected by sensors on the vehicle and/or transmitted/received on the vehicle by means of a mobile radio communication interface. A type of passive or remotely controlled, autonomous movement of the vehicle without a user is also conceivable, for example, in order to move a vehicle from a storage location to a transfer location or vice versa.

The vehicle frame of the three-wheeled vehicle may be formed from at least two frame modules, the frame modules being releasably coupled to one another and/or being coupled movably to one another.

The vehicle may comprise a front frame module on which a windshield is arranged.

Furthermore, the vehicle may comprise a rear frame module on which a backrest of a vehicle seat is arranged.

The vehicle may further comprise an upper frame module on which a vehicle roof is arranged.

The front frame module and the upper frame module may also be formed as a common front frame module which comprises the windshield and the vehicle roof.

Finally, the vehicle may comprise a lower frame module on which the front-axle device and the rear-axle device are arranged.

The frame modules may be able to be coupled to one another or dismantled from one another without any tools, thereby simplifying assembly or disassembly of a vehicle. Thanks to the modular structure, it is furthermore possible to replace damaged frame modules quickly so that a vehicle may be put back into operation after a short downtime or repair time. The frame modules described herein may be combined with the above-described components or modules of the front-axle device and rear-axle device, which may be formed as a unit.

The frame modules mentioned may also be connected to one another in an articulated manner, so that they may be moved, rotated and pivoted relative to one another. In the case of an articulated connection between two frame modules, a hinge may be used that may be fixed in one position and released so that the frame module may be folded around this hinge, for example. If the frame modules are embodied to be completely demountable, they may be connected to one another by a plug connection and/or screwed and/or fixed to one another by means of pins.

The invention is described in more detail below with reference to the attached figures, in which.

Figure 1:
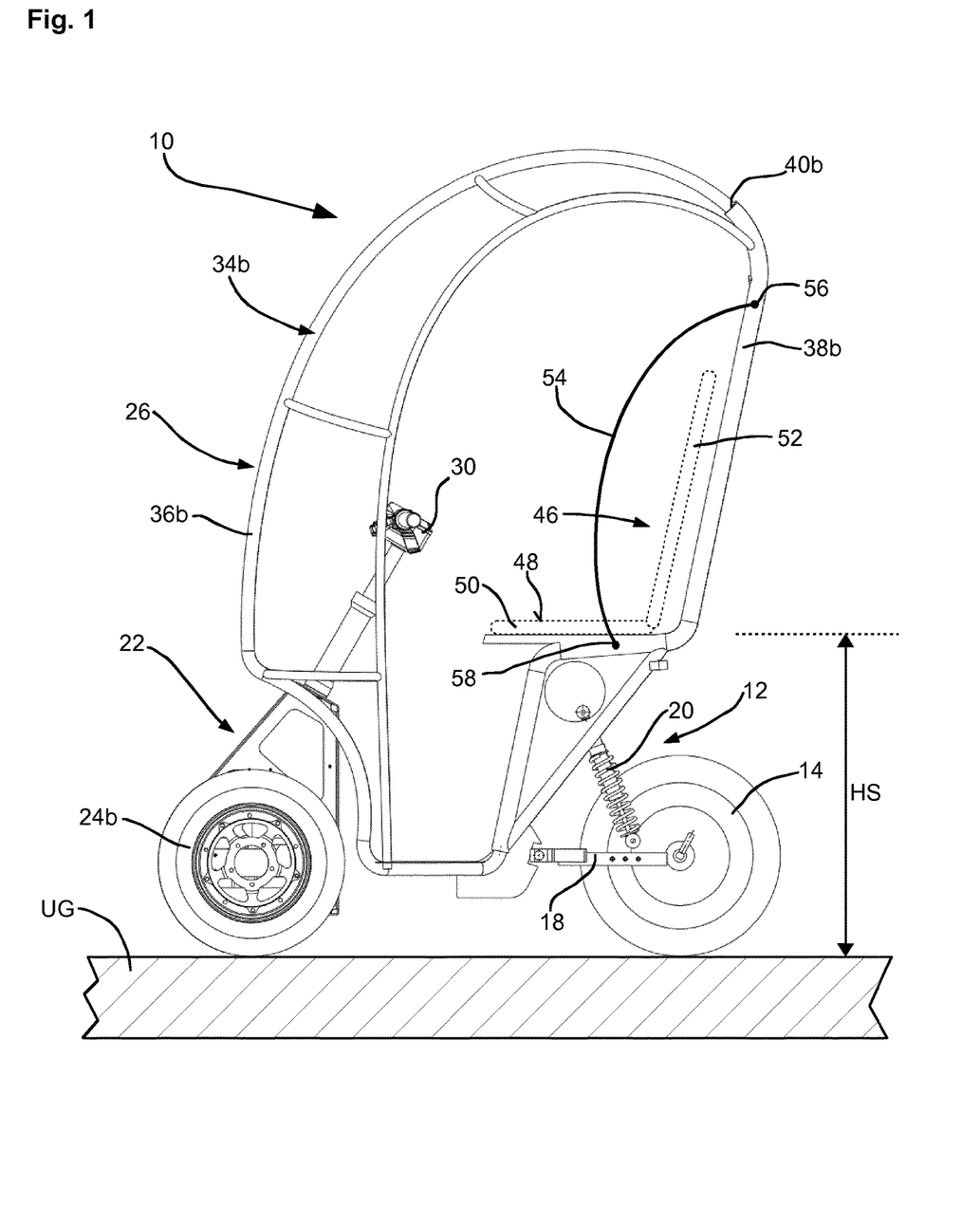
FIG. 1 shows a simplified and schematic side view of a three-wheeled vehicle.

FIG. 1 shows a three-wheeled electric vehicle 10 in a schematic and simplified side view. The vehicle 10 comprises a rear-axle device 12 comprising a rear wheel 14. The rear-axle device 12 comprises, for example, a movable wheel suspension 18 and a suspension device 20 comprising a shock absorber. Two front wheels 24*a*, 24*b* are arranged on a front-axle device 22, of which only the left front wheel 24*b* is visible in FIG. 1. The rear-axle device 12 and the front-axle device 22 are supported on a vehicle frame 26.

The vehicle frame 26 is closed in itself and formed such that it surrounds an occupant or driver accommodated in the vehicle 10, and din particular surrounds the upper body and head of a driver.

Figure 2:
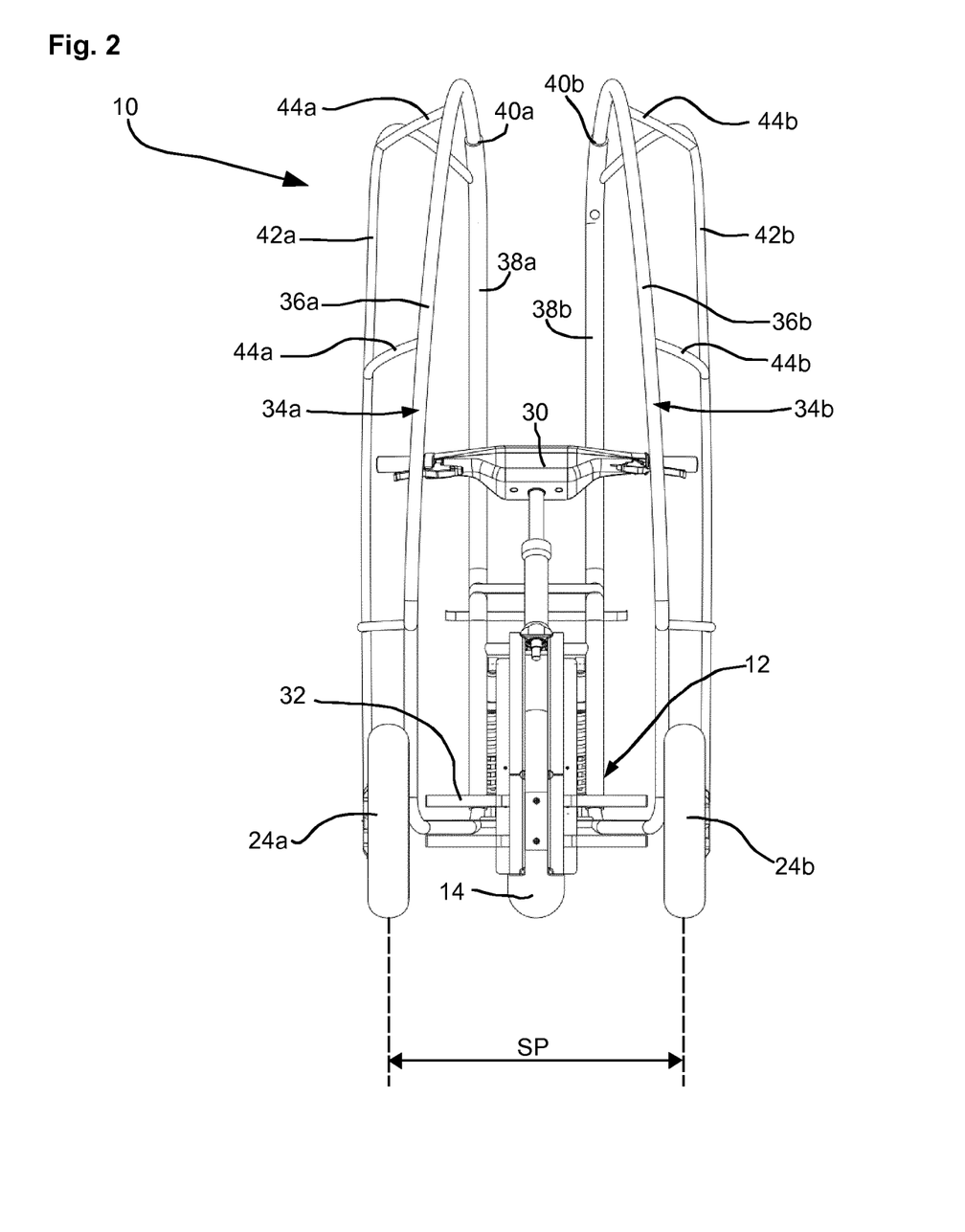
FIG. 2 shows a simplified and schematic front view of the three-wheeled vehicle of FIG. 1.
Figure 3:
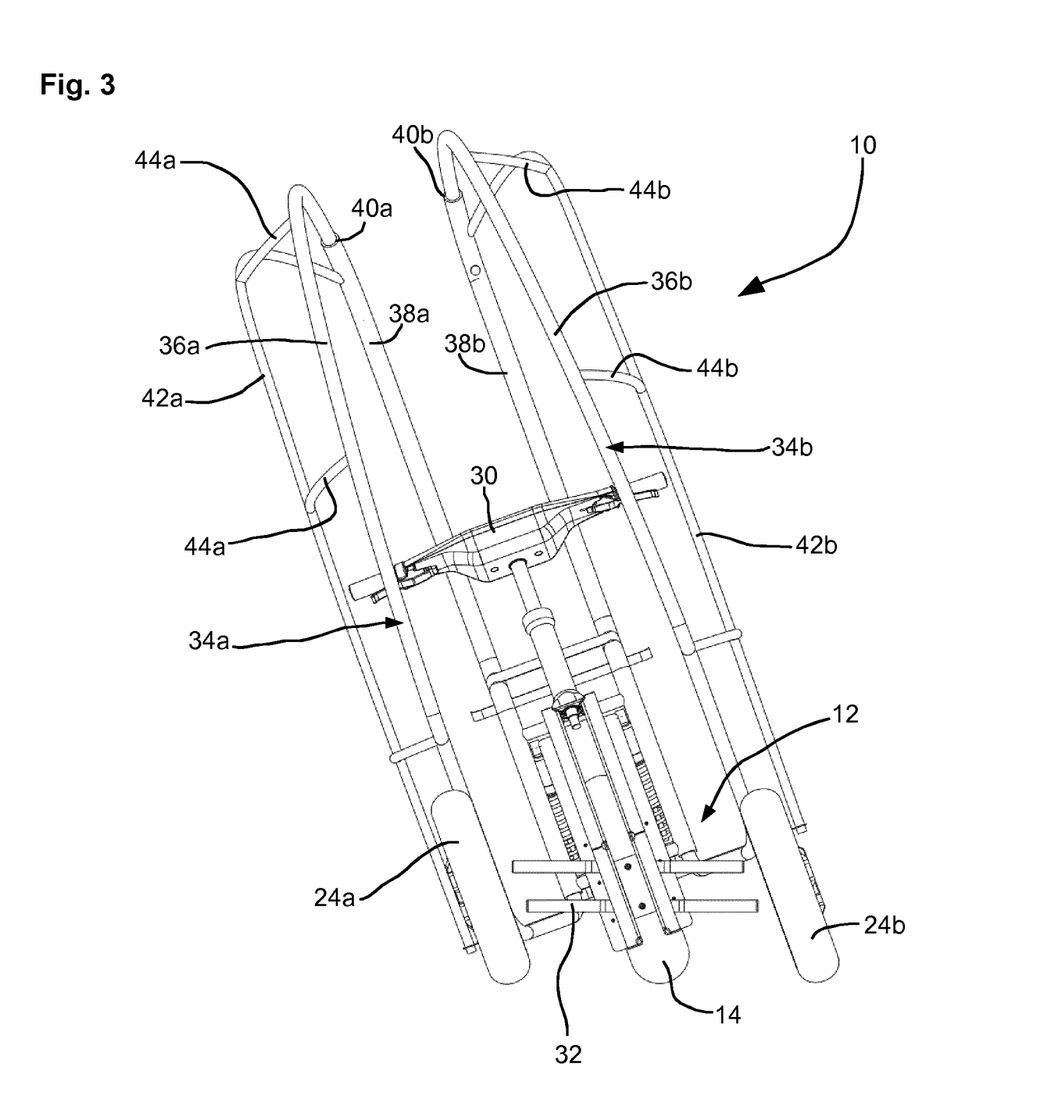
FIG. 3 shows a simplified and schematic front view of the three-wheeled vehicle of FIG. 1 in a tilted position when cornering.

It may be seen from FIGS. 2 and 3 that the two front wheels 24*a*, 24*b* are embodied to be steerable. In particular, the two front wheels 24*a*, 24*b* are coupled to a steering device 30, for example a handlebar, so that the driver may determine a direction of travel by moving the steering device 30. The front-axle device comprises a parallel kinematic wheel suspension 32, so that the front wheels 24*a*, 24*b* and the vehicle frame 26 may be tilted in the direction of the inside of the curve when cornering. This is shown by way of example in FIG. 3, in which the vehicle 10 is shown in a position tilted to the right.

From FIG. 2, a possible structure of the vehicle frame 26 becomes apparent more clearly. In this case, the vehicle frame 26 comprises two main frames 34*a*, 34*b*, which are each formed as closed or circumferential support elements. The two main frames 34*a*, 34*b* may be formed from a plurality of main frame sections which are connected to one another. The connection of frame elements or frame sections may be detachable or non-detachable, and/or by a material fit (welded, glued) or/and by a form fit (clamped, screwed). For example, it may be seen from the illustration in FIG. 2 that the main frames 34*a*, 34*b* comprise a front main frame section 36*a*, 36*b* and a rear main frame section 38*a*, 38*b*, which are coupled to one another at connection points 40*a*, 40*b*. The rear-axle device 12 and the front-axle device 22 are connected to the two main frames 34*a*, 34*b*. In other words, the main frames 34*a*, 34*b* form a type of chassis of the vehicle that is connected to the undercarriage (axle devices 12, 22 with wheels 14, 24*a*, 24*b*).

On the two main frames 34*a*, 34*b*, auxiliary frames 42*a*, 42*b* are attached laterally. The auxiliary frames 42*a*, 42*b* are connected to the respective main frame 34*a*, 34*b*, in particular by means of a plurality of struts 44*a*, 44*b*. The auxiliary frames 42*a*, 42*b* serve in particular to support a casing for the vehicle 10, which will be described later.

It should be noted that the embodiment shown of the vehicle frame 26 comprising main frames 34*a*, 34*b* and auxiliary frames 42*a*, 42 is merely exemplary. It is also conceivable for laterally outer frame elements, such as those shown here as auxiliary frames 42*a*, 42*b*, to serve as the main frames. It should further be noted that the vehicle frame may also comprise further frame elements and connections and may also have geometrically different shapes than those shown here. What is essential is that the vehicle frame is a closed structure surrounding the occupants or the driver.

Figure 4:
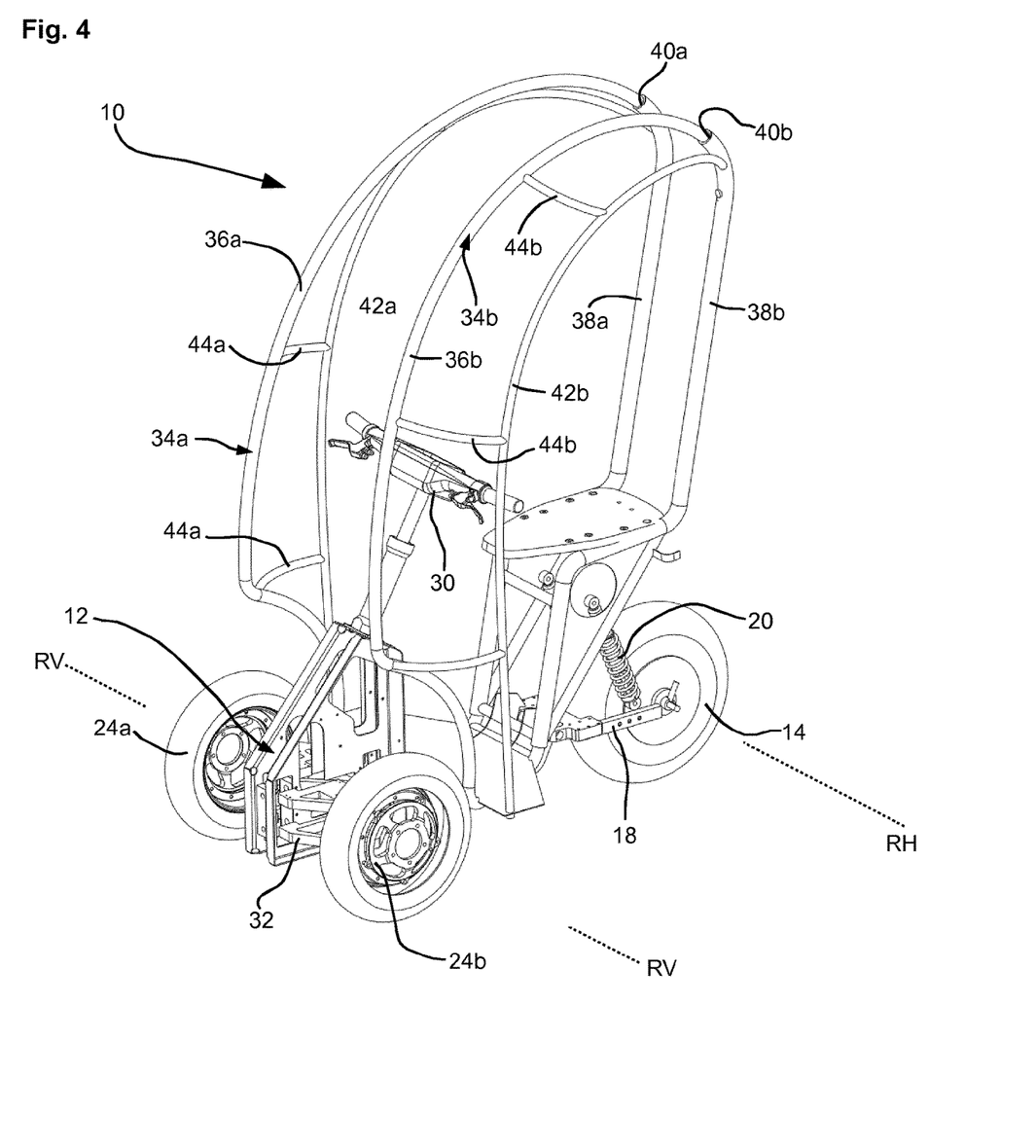
FIG. 4 shows a simplified and schematic perspective view of the three-wheeled vehicle of FIG. 1 obliquely from the front left.

FIG. 4 shows the vehicle 10 in a perspective view obliquely from the front. For the illustrated reference numerals, reference is made to the above description of FIGS. 1 to 3, in which each of these reference numerals has already been described. In FIG. 4, the axis of rotation RV of the front wheels 24*a*, 24*b* in the straight-run position and the axis of rotation RH of the rear wheel are indicated in addition. As may be seen in particular from FIGS. 2 and 4, the front wheels 24*a*, 24*b* are aligned essentially parallel to one another when the vehicle is running straight ahead. When cornering, as shown in FIG. 3, the parallelism of the front wheels 24*a*, 24*b* is altered in that at least the front wheel on the inside of the curve is usually turned a little more than the front wheel on the outside of the curve, as is commonly the case for kingpin steering (Ackermann principle).

It should be noted that the front-axle device 22, together with a tilt kinematics system 32 of the front wheels 24*a*, 24*b*, may be detachably connected to the vehicle frame (26) as a complete unit. Furthermore, the rear-axle device 12, together with the wheel suspension 18 (FIG. 1) and a suspension device 20 (FIG. 1), may be detachably connected to the vehicle frame 26 as a unit.

Figure 5:
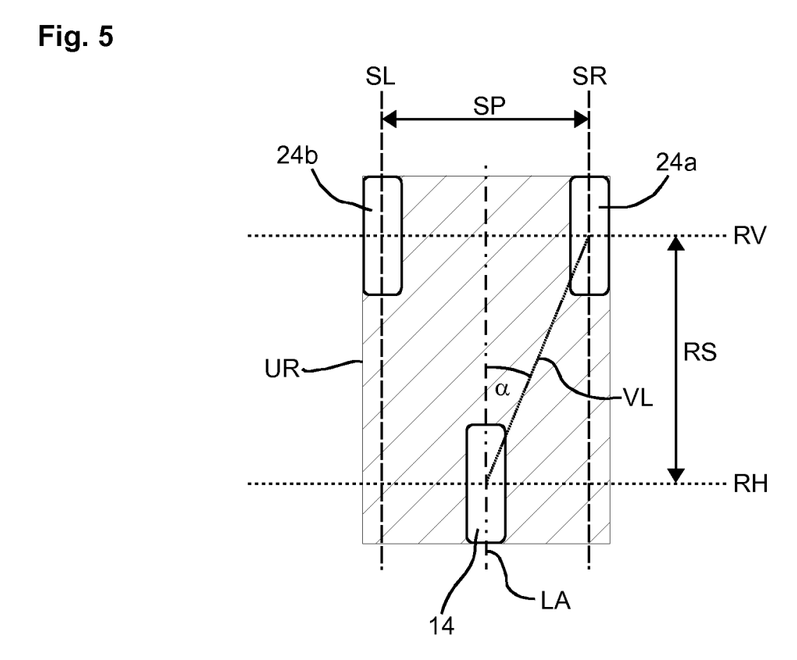
FIG. 5 shows a purely schematic representation of three wheels of an electric vehicle and associated dimensions.

FIG. 5 shows a schematic view of the two front wheels 24*a*, 24*b* and the rear wheel 14 of the vehicle 10. The two axes of rotation RV and RH (FIG. 4) are also shown again in this illustration. The dashed lines SR and SL illustrate the respective track of the relevant front wheel 24*a*, 24*b*. The two front wheels 24*a*, 24*b* are shown in FIG. 5 in the straight-run position of the vehicle 10, the two front wheels 24*a*, 24*b* being aligned essentially parallel to one another. The dash-dotted line LA shows a central longitudinal axis of the vehicle 10. This longitudinal axis LA also illustrates the track of the rear wheel 14 when the vehicle 10 is running straight ahead.

A wheelbase RS is measured between the two axes of rotation RV and RH. The wheelbase is measured between the wheel centers of the front wheels 24*a*, 24*b* and the rear wheel. The distance between the two front wheels 24, 24*b* or their track width SP is measured between the two track lines SL and SR. The track width is the distance between the wheel contact points of the two front wheels 24*a*, 24*b*.

As may be seen from FIGS. 1 to 4, the vehicle presented here has a very compact design. This design may be expressed by the following characteristic numbers, which are determined with reference to FIG. 5.

A compactness value KW, which is calculated from the ratio between the distance SP between the front wheels 24*a*, 24*b*, which are arranged essentially parallel to one another in the straight-run position, and the wheelbase RS between the front wheels 24*a*, 24*b* and the rear wheel 14 measured in the straight-run position of the front wheels 24*a*, 24*b*, satisfies the following condition:

with $KW=SP/RS$ $0.35 \leq KW \leq 0.80$, more preferably $0.62 \leq KW \leq 0.78$.

The wheelbase RS is 1300 mm or less, more preferably 900 mm to 1100 mm. The wheelbase RS of the vehicle 10 is thus on the order of a bicycle. The distance SP (track width) between the front wheels 24*a*, 24*b*, which are arranged essentially parallel in the straight-run position, is 1000 mm or less and 500 mm or more, more preferably 600 mm to 700 mm. On the one hand, this results in a very compact construction of the vehicle 10 generally and specifically at a wheelbase of 900 mm to 1100 mm and a track width of the front wheels 24*a*, 24*b* of 600 mm to 700 mm, with the vehicle requiring very little space.

In particular, a rectangle UR surrounding the three wheels 14, 24*a*, 24*b*, as illustrated by hatching in FIG. 5, occupies an area that is smaller than 1.5 m². In particular, the wheelbase RS and the track width SP may be selected such that the rectangle UR circumscribing the three wheels, which may be understood as a kind of projected base area of the vehicle and which may be determined from the vehicle length and width as rectangle sides, for example, has a surface area of about 0.8 to 1.2 m².

Another condition to be met by a vehicle 10 is that the rear wheel 14 is arranged centrally between the front wheels 24*a*, 24*b* in the straight-run position, such that between the centrally extending longitudinal axis LA of the vehicle 10 and an imaginary connecting line VL between the rear wheel 14 and one of the front wheels 24*a*, an angle α is formed which is 15° and more, more preferably 17.5° and more. Typically, the angle α will not be greater than 40°, more preferably it is smaller than 35°.

In order to enable a driver to have a good view from the vehicle 10 regardless of their body size, a seat device 46 should be arranged in the vehicle 10 in such a way that a seat surface 48 of a seat 50 of the seat device 46 in the unloaded state of the vehicle is at a height HS of 700 mm or more above the ground UG supporting the vehicle 10. This is illustrated in a simplified manner in FIG. 1. It should be noted that when measuring the height HS, a cushion possibly arranged on the seat 50 may be disregarded because it is subject to deformations that are dependent on the body weight of the driver.

The seat 50 of the seat device 46 may be designed to be adjustable relative to the vehicle frame 26 in the longitudinal direction of the vehicle 10. The seat device 46 may have a backrest 52, indicated by dashed lines in FIG. 1, which is adjustable with the seat 50 in the longitudinal direction of the vehicle 10 and/or which is adjustable relative to the seat 50.

A safety device 54, in particular a seat belt device, is arranged on the vehicle frame 26, in particular on its main frames 34*a*, 34*b*. This is also illustrated purely schematically in FIG. 1. At least one holding point 56 of the safety device 54 is arranged on the vehicle frame 26 in such a way that forces acting on the safety device are introduced into an upper and/or front section of the vehicle frame 26, in particular the main frames 34*a*, 34*b* and/or the auxiliary frames 42*a*, 42. Another holding point 58 is arranged, for example, below the seat 50 on the vehicle frame 26 or a main frame 34*a*, 34*b*.

Figure 6:
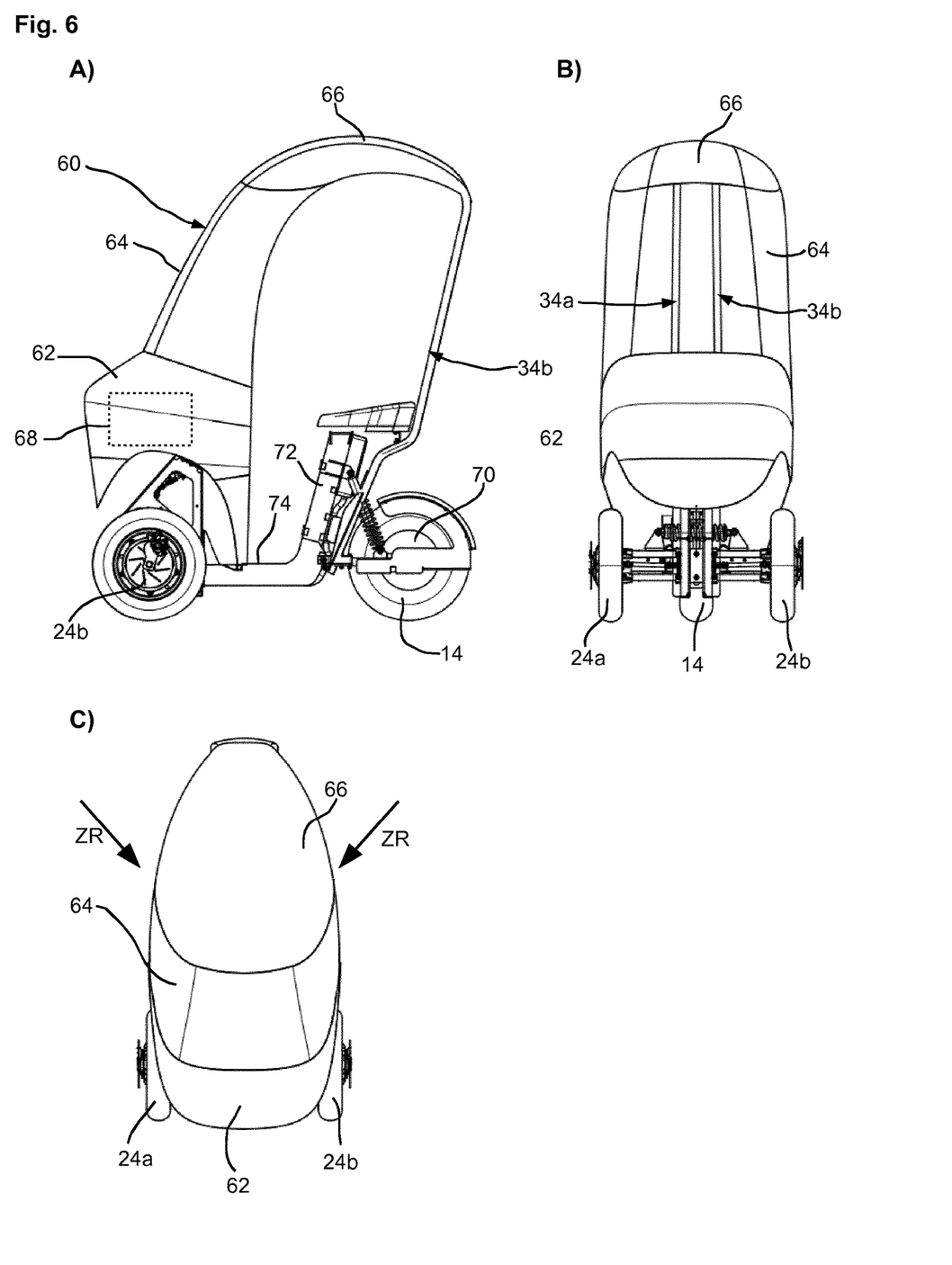
FIG. 6, in sub-figures A) to C), shows a side view, a front view, and a top view from above of an electric vehicle with a casing.

FIG. 6, in sub-figures A) to C), shows a vehicle 10 comprising a casing 60. In the present example of FIG. 6, the casing 60 is formed, purely by way of example, from a front casing element 62, a transparent pane casing element 64 and a roof casing element 66. The casing 60 is, in particular, formed in such a way that access to the vehicle is enabled on both sides obliquely from the rear or from the side in relation to its longitudinal direction, which is indicated by the two arrows ZR in FIG. 6C. The casing 60 may comprise at least one solar panel. A solar panel may be part of a roof casing element 66 or a front casing element 62, for example.

The vehicle frame of the vehicle 10 is formed such that a storage space 68 is formed in an area above the front wheels 24*a*, 24*b*, which is shown in FIG. 6A purely schematically as a dashed rectangle.

For the sake of completeness, it should also be noted that the electric drive may be formed as a wheel hub motor 70 which acts on the rear wheel 14. Furthermore, the vehicle 10 may have a battery arrangement 72, which is arranged below the seat 50, for example, with other positions within the vehicle 10 also being conceivable, for example in the area of a footrest 74. A battery arrangement comprises at least one battery and is preferably formed such that the at least one battery is received in a detachable fastening, a detachable electrical contact from the battery to the power supply lines of the vehicle being made at the same time that the battery is received in the fastening.

Alternatively, the battery arrangement may comprise a battery compartment in a base plate, which is provided with a lid, with a lock being provided on the lid, which may be unlocked by activating a switch or triggering the activation on a mobile device.

Figure 7:
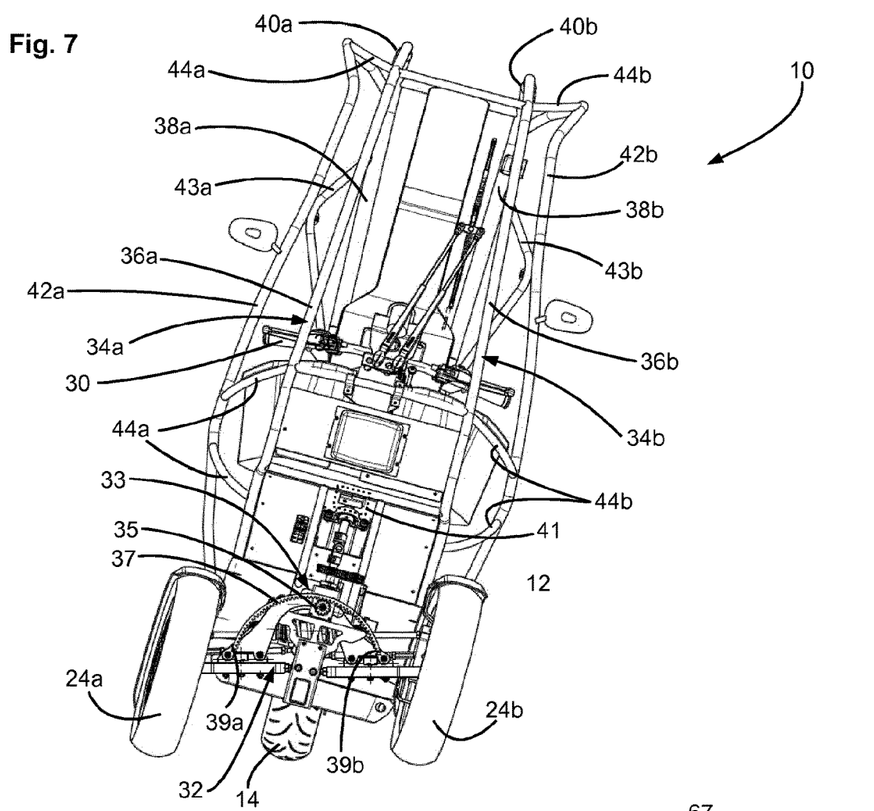
FIG. 7 shows a simplified and schematic front view of an embodiment of the three-wheeled vehicle comprising a tilt actuator.

FIG. 7 shows a schematic and simplified front view of the vehicle 10 in a slightly modified configuration or embodiment. The vehicle frame 26 also includes two main frames 34a, 34b which, when the vehicle 10 is assembled, are each formed as closed or circumferential support elements. The two main frames 34a, 34b may be formed from several main frame sections which are connected to one another. The connection of frame elements or frame sections may be formed in a detachable or non-detachable manner, and/or with a material fit (welded, glued) and/or with a form fit (clamped, screwed). For example, it may be seen from the illustration in FIG. 7 that the main frames 34a, 34b comprise a front main frame section 36a, 36b and a rear main frame section 38a, 38b, which are coupled to one another at connection points 40a, 40b. The rear-axle device 12 and the front-axle device 22 are connected to the main frames 34a, 34b. In other words, the main frames 34a, 34b form a type of chassis of the vehicle that is connected to the undercarriage (axle devices 12, 22 with wheels 14, 24a, 24b).

On the two main frames 34a, 34b, auxiliary frames 42a, 42b are attached laterally. The auxiliary frames 42a, 42b are connected to the respective main frame 34a, 34b, in particular by means of a plurality of struts 44a, 44b. The auxiliary frames 42a, 42b serve in particular to support the casing for the vehicle 10, which is not shown here.

It should be noted again that the embodiment of the vehicle frame 26 shown here comprising main frames 34a, 34b and auxiliary frames 42a, 42 is purely exemplary. It is also conceivable for laterally outer frame elements, such as those shown here as auxiliary frames 42a, 42b, to serve as the main frames. It should also be noted that the vehicle frame may also comprise further frame elements and connections and may also comprise shapes geometrically different from those shown here. What is essential is that the vehicle frame is a closed structure surrounding the occupants or the driver.

In the embodiment of FIG. 7, the vehicle frame 26 also includes two angle sections 43a, 43b arranged laterally at the rear. The angle sections 43a, 43b are arranged or fastened to the rear main frame sections 38a, 38b. The angular sections 43a, 43b form a kind of protective components that protrude to the side and to the front and may protect a vehicle user from an impact from the lateral rear side. In particular, the angular sections 43a, 43b may serve as protection for the shoulders of a user in the event that the vehicle 10 tips over to the side due to the action of external forces (side impact by another road user). It should be noted in this context that the vehicle 10 does not tip over in its normal operation due to its compactness value (see description above), but rather stands or drives stably on its three wheels in every driving and cornering situation.

In the area of the parallel kinematic wheel suspension 32, which may also generally be referred to as tilt kinematics system, a tilt actuator 33 is provided in this embodiment. The tilt actuator 33 is embodied as a motor with a pinion 35, for example. The pinion 35 engages a curved toothed rack 37, the ends 39a, 39b of which are connected to a cross member of the wheel suspension 32. The tilt actuator 33 serves in particular to ensure that the lateral tilt of the vehicle 10 is adjustable by means of corresponding control of the motor or pinion 35. The embodiment shown here of the tilt actuator 33 comprising a pinion 35 is purely exemplary. The tilt actuator 33 may also be formed by one or more adjusting cylinders, the adjusting cylinders being able to be actuated mechanically and/or pneumatically or hydraulically in order to be able to adjust the lateral tilt of the vehicle 10.

In FIG. 7, a steering actuator 41 is further shown purely schematically as a dashed rectangle, which steering actuator may be configured to adjust a steering angle of the front wheels 24a, 24b. The steering actuator 41 may be formed in such a way that it executes steering movements of the vehicle 10 in a fully automated manner or at least partially supports manual steering movements by a user or allows manual steering movements of the user only.

Figure 8:
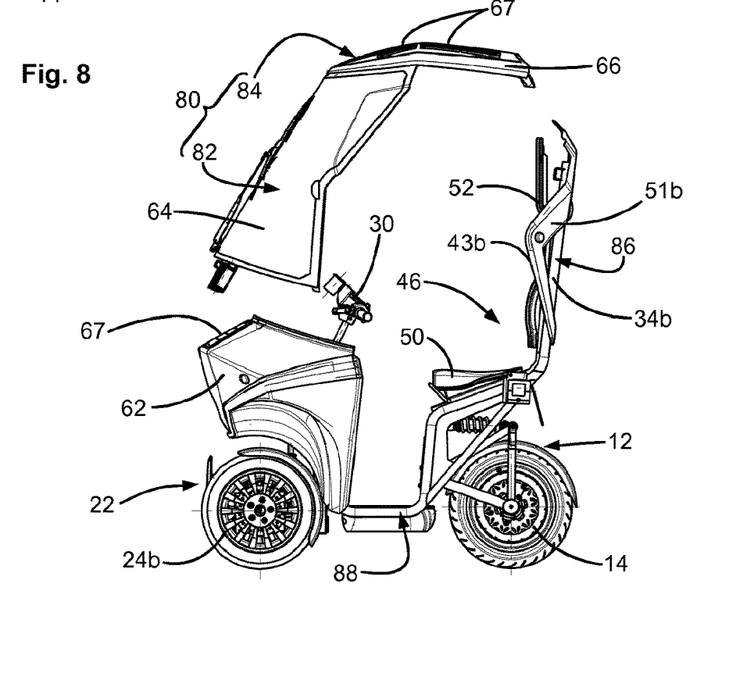
FIG. 8 shows a simplified and schematic side view of an embodiment of the three-wheeled vehicle comprising a raised frame module.

FIG. 8 shows, in a simplified side view, the vehicle 10 comprising a front frame module 80 raised or separated from the rest of the vehicle 10. The front frame module 80 comprises frame sections of the vehicle frame 26 and, in this example, the windshield 64 and the roof 66, which are connected to the corresponding frame sections.

The front frame module 80 is shown in FIG. 8 as a single frame module. It should be noted, however, that it may also be composed of a plurality of parts, for example as a front frame module 82 on which the windshield 64 is attached, and as an upper frame module 84 on which the roof 66 is attached. In such a case, the upper frame module 84, together with the roof 66, could be the only frame module to be removed from the vehicle 10 in order to enable open driving, comparable to a convertible.

From the side view of FIG. 8, the configuration of the angle section 43b mentioned above with reference to FIG. 7 may also be seen, which is shown as the only angle section in this view. In FIG. 8, the angle section 43b, which is attached to the vehicle frame 26, in particular the rear frame section 34b, is covered by a cover or cladding 51b. In addition, it should be noted that some reference numerals have also been added in the illustration in FIG. 8, which will be described later with reference to FIG. 9.

Figure 9:
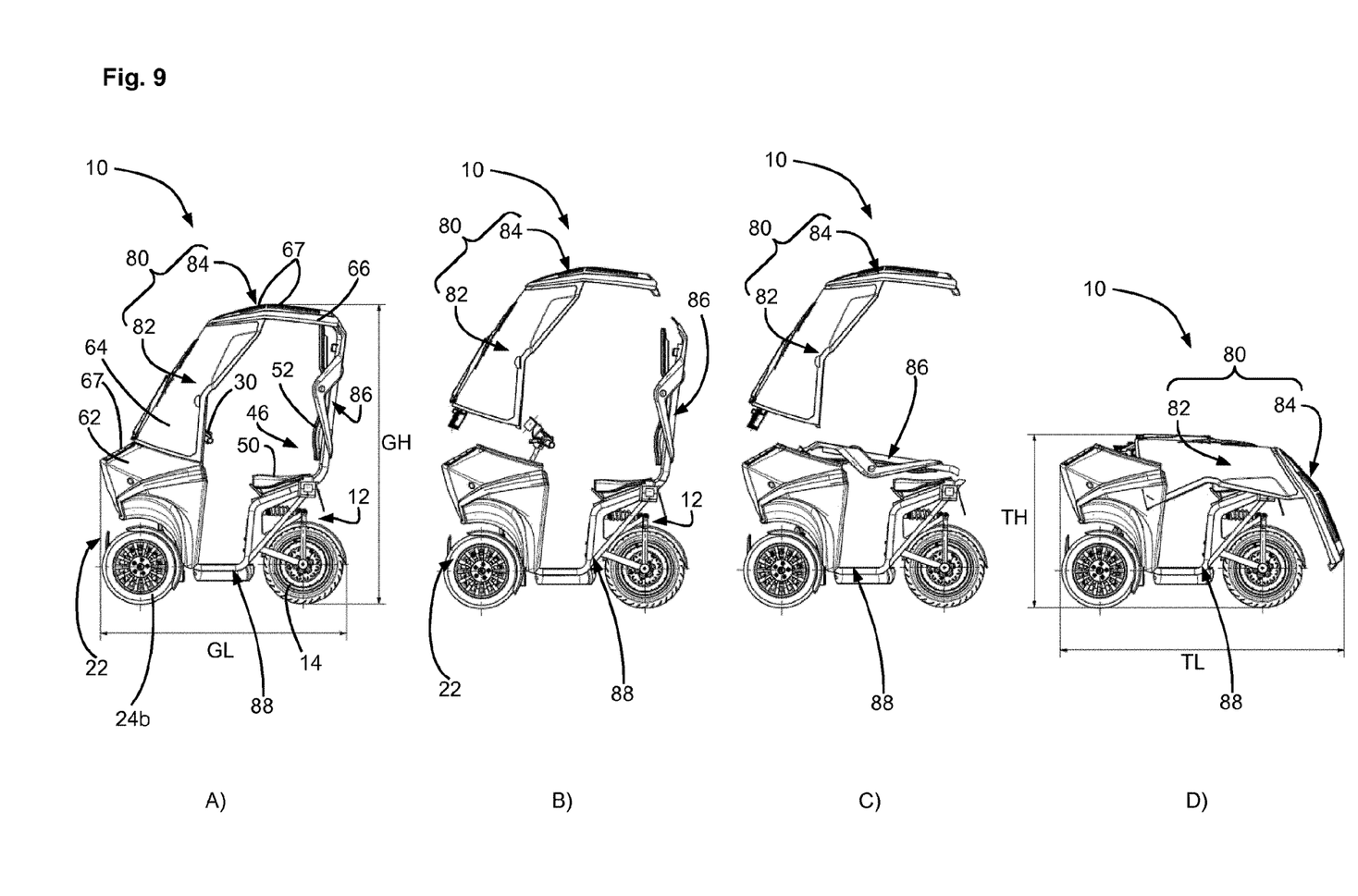
FIG. 9 shows a simplified and schematic side view of the embodiment of the three-wheeled vehicle of FIG. 8, wherein various frame modules and their assembled or disassembled state can be seen from the partial representations A) to D).

FIG. 9, in the sub-figures A) to D), shows the vehicle 10 in the embodiment of FIGS. 7 and 8 in different assembly or dismantling states in a schematic and simplified manner. FIG. 9 serves in particular to illustrate the modular structure of the vehicle 10 by way of example.

FIG. 9A shows the vehicle 10 in a fully assembled state. The left front wheel 24b, the rear wheel 14, the vehicle frame 26, the steering device 30 and the seat device 46 having a seat 50 and a backrest 52 may be seen. The vehicle 10 comprises a casing 60 which comprises, for example, a front casing element 62, a transparent pane casing element 64 and a roof casing element 66. Solar panels 67 may be arranged on the roof casing element 66. Furthermore, solar panels 67 may also be provided on the front casing element 62.

FIG. 9B shows a scaled-down representation of the vehicle 10 as shown already in FIG. 8. As described above, the front frame module 80 is shown separated or lifted from the rest of the vehicle 10. The front frame module 80 may be removed from the rest of the vehicle 10 as a modular piece.

FIG. 9C shows by way of example that a rear frame module 86 may be separated from the rest of the vehicle 10 or may be folded forward relative thereto. The rear frame module 86 may include the backrest 52, for example. Furthermore, the angle sections 43a, 43b (see FIG. 8) may also be assigned to the rear frame module 86.

FIG. 9D shows a state in which the front frame module 80 is arranged above the rear frame module 86 folded forward. The front frame module 80 and the rear frame module 86 rest on a lower frame module 88. In particular, the lower frame module 88 may be that part of the vehicle 10 onto which the front-axle device 22 and the rear-axle device 12 are attached. Even if the lower frame module 88 is mentioned for the first time with reference to FIG. 9D, it is clear that the lower frame module 88 may be seen in the other representations of FIGS. 9A to 9C, too.

In an assembled state according to FIG. 9A, the vehicle 10 has a total length GL and a total height GH. In a partially dismantled state according to FIG. 9D, which may also be referred to as the transport state or storage state, for example, the vehicle 10 has a transport length TL and a transport height TH. The transport length may be slightly larger than the total length GL. By means of a corresponding configuration of the front frame module 80 and its arrangement on the lower frame module 88 in the transport state (FIG. 9D), the transport length corresponds to a maximum of approximately 1.25 times the total length. The transport length is preferably about 10% to 15% greater than the total length. The transport height TH is significantly smaller than the total height GH. In particular, the transport height may be approximately 0.65 times the total height GH. The transport height TH is preferably about 55% to 40% smaller than the total height GH.

Due to the modular structure, the vehicle 10 may, on the one hand, be quickly assembled or disassembled. This is advantageous, for example, if part of the vehicle 10 has to be replaced in the course of repair or maintenance. If, for example, a windshield 64 is worn due to the effects of the weather, falling rocks or the like, or if it has cracks or splits, the vehicle may be quickly repaired by replacing the front frame module 80 without causing long downtimes.

On the other hand, the vehicle 10 may be reduced in size in a simple manner due to the modular structure in order to transport or store it. This allows, for example, for storing more vehicles 10 in their transport state in a smaller space (FIG. 9D).

With reference to FIGS. 9C and 9D, it should be noted that the steering device 30 may be configured to be removable. In particular, the steering device 30 may be removed from a handlebar and housed in a storage space 68 arranged behind the front casing element 62. The steering device 30 may also be of modular construction.

All frame modules, such as front frame module 82, upper frame module 84, rear frame module 86 and lower frame module 88 may be articulated, in particular via a respective hinge arrangement that may be fixed in a position and released so that one frame module in question may move or fold around this hinge. Alternatively or in addition, the frame modules may be embodied to be completely demountable, for example using plug connections, screw connections, pin connections and the like. Of course, combinations of such fastenings of the frame modules may also be provided, for example the front frame module 82 and the upper frame module 84 may be completely disassembled from the rest of the vehicle 10, with the rear frame module 86 being articulated to the lower frame module 88 so that the rear frame module 86 may be folded open or closed relative to the lower frame module 88.

The three-wheeled electric vehicle described herein has a very compact design and takes up very little space or are both in traffic and when the vehicle is stationary or parked. Thus, the presented electric vehicle is particularly suitable as a means of transportation for individuals in urban environments. Due to its safety-related configuration and the use of tilting technology, the vehicle may currently be used at a speed of 45 km/h by everyone who holds a driver's license for passenger cars or small motorcycles.

The invention claimed is:

1. A three-wheeled electric vehicle, comprising:
   a front-axle device having two steerable front wheels which are aligned in parallel to one another in a straight-run position;
   a rear-axle device comprising a driven rear wheel; and
   a vehicle frame on which the front-axle device and the rear-axle device are supported,
   wherein the front-axle device is formed such that, during a steering movement, the vehicle frame and the two steerable front wheels may tilt in a direction of the steering movement,
   wherein a compactness value KW, which is calculated from a ratio between a distance SP of the two steerable front wheels and a wheelbase RS measured between the two steerable front wheels and the driven rear wheel in the straight-run position of the two steerable front wheels, satisfies the following condition:

with $KW=SP/RS$, $0.35 \leq KW \leq 0.80$, wherein the vehicle frame is closed in on itself and formed such that the vehicle frame is configured to surround a driver having an upper body and head accommodated in the vehicle,
   wherein a safety belt device is arranged on the vehicle frame,
   wherein at least one holding point of the safety belt device is arranged on the vehicle frame such that forces acting on the safety belt device are introduced into an upper and/or front section of the vehicle frame,
   wherein the front-axle device, together with a tilt kinematics system of the two steerable front wheels, is releasably connected to the vehicle frame as a complete unit.

2. The three-wheeled electric vehicle of claim 1, wherein the wheelbase RS is 1300 mm or less, and wherein the distance SP of the two steerable front wheels is 1000 mm or less and 500 mm or more.

3. The three-wheeled electric vehicle of claim 1, wherein the driven rear wheel, in the straight-run position, is arranged centrally between the two steerable front wheels such that an angle is formed between a central longitudinal axis of the vehicle and an imaginary connecting line between the driven rear wheel and one of the two steerable front wheels which is 15° or more.

4. The three-wheeled electric vehicle of claim 1, wherein a seat device for a driver of the vehicle is arranged on the vehicle frame, wherein a seat surface of a seat of the seat device in an unloaded state of the vehicle is located at a height above the ground supporting the vehicle which is 700 mm or more.

5. The three-wheeled electric vehicle of claim 4, wherein the seat of the seat device is adjustable in a longitudinal direction of the vehicle relative to the vehicle frame by 150 to 200 mm along an adjustment plane that is parallel or inclined to the ground.

6. The three-wheeled electric vehicle of claim 1, further comprising an electric drive formed as a wheel hub motor configured to act on the driven rear wheel.

7. The three-wheeled vehicle of claim 1, wherein the rear-axle device, together with a wheel suspension and a suspension device, is releasably connected as a unit to the vehicle frame.

8. The three-wheeled vehicle of claim 1, further comprising at least one tilt actuator configured to adjust a lateral tilt of the vehicle when cornering.

9. The three-wheeled vehicle of claim 8, wherein the at least one tilt actuator is configured to set the lateral tilt based on a function of a detected steering angle and/or the speed of the vehicle or/and from the lateral inclination of the vehicle relative to the ground.

10. The three-wheeled vehicle of claim 1, further comprising at least one steering actuator configured to set a steering angle of the two steerable front wheels.

11. The three-wheeled vehicle of claim 10, wherein the at least one steering actuator is configured to carry out steering movements in a fully automated manner or to at least partially support manual steering movements by a user or to allow manual steering movements of the user only.

12. The three-wheeled vehicle of claim 1, wherein the vehicle frame is formed from at least two frame modules, and wherein the at least two frame modules are releasably coupled to one another or/and are movably coupled to one another.

13. The three-wheeled vehicle of claim 12, wherein the at least two frame modules are configured to be coupled to one another or dismantled from one another without any tools.

14. The three-wheeled vehicle of claim 12, wherein the at least two frame modules comprise:
   a front frame module on which a windscreen is arranged; and/or
   a rear frame module on which a backrest of a vehicle seat is arranged; and/or
   an upper frame module on which a vehicle roof is arranged; and/or
   a lower frame module on which the front-axle device and the rear-axle device are arranged.

15. A three-wheeled electric vehicle, comprising:
   a front-axle device having two steerable front wheels which are aligned in parallel to one another in a straight-run position;
   a rear-axle device comprising a driven rear wheel; and
   a vehicle frame on which the front-axle device and the rear-axle device are supported,
   wherein the front-axle device is formed such that, during a steering movement, the vehicle frame and the two steerable front wheels may tilt in a direction of the steering movement,
   wherein a compactness value KW, which is calculated from a ratio between a distance SP of the two steerable front wheels and a wheelbase RS measured between the two steerable front wheels and the driven rear wheel in the straight-run position of the two steerable front wheels, satisfies the following condition:

with $KW=SP/RS$, $0.35 \leq KW \leq 0.80$, wherein the vehicle frame is closed in on itself and formed such that the vehicle frame is configured to surround a driver having an upper body and head accommodated in the vehicle,
   wherein a safety belt device is arranged on the vehicle frame,
   wherein at least one holding point of the safety belt device is arranged on the vehicle frame such that forces acting on the safety belt device are introduced into an upper and/or front section of the vehicle frame,
   wherein the driven rear wheel, in the straight-run position, is arranged centrally between the two steerable front wheels such that an angle is formed between a central longitudinal axis of the vehicle and an imaginary connecting line between the driven rear wheel and one of the two steerable front wheels which is 15° or more.

16. A three-wheeled electric vehicle, comprising:
   a front-axle device having two steerable front wheels which are aligned in parallel to one another in a straight-run position;
   a rear-axle device comprising a driven rear wheel; and
   a vehicle frame on which the front-axle device and the rear-axle device are supported,
   wherein the front-axle device is formed such that, during a steering movement, the vehicle frame and the two steerable front wheels may tilt in a direction of the steering movement,
   wherein a compactness value KW, which is calculated from a ratio between a distance SP of the two steerable front wheels and a wheelbase RS measured between the two steerable front wheels and the driven rear wheel in the straight-run position of the two steerable front wheels, satisfies the following condition:

with $KW=SP/RS$, $0.35 \leq KW \leq 0.80$, wherein the vehicle frame is closed in on itself and formed such that the vehicle frame is configured to surround a driver having an upper body and head accommodated in the vehicle,
   wherein a safety belt device is arranged on the vehicle frame,
   wherein at least one holding point of the safety belt device is arranged on the vehicle frame such that forces acting on the safety belt device are introduced into an upper and/or front section of the vehicle frame,
   wherein a seat device for a driver of the vehicle is arranged on the vehicle frame, wherein a seat surface of a seat of the seat device in an unloaded state of the vehicle is located at a height above the ground supporting the vehicle which is 700 mm or more.

\* \* \* \* \*